Sept. 6, 1966  E. H. FILIPAK  3,270,660
COOKING OVEN

Filed July 23, 1964  3 Sheets-Sheet 1

INVENTOR
EDMUND H. FILIPAK
BY Robert T. French
ATTORNEY

Sept. 6, 1966   E. H. FILIPAK   3,270,660
COOKING OVEN

Filed July 23, 1964   3 Sheets-Sheet 2

INVENTOR
EDMUND H. FILIPAK
BY
ATTORNEY

United States Patent Office 3,270,660
Patented Sept. 6, 1966

3,270,660
COOKING OVEN
Edmund H. Filipak, Lexington, Ohio, assignor to Westinghouse Electric Corporation, East Pittsburgh, Pa., a corporation of Pennsylvania
Filed July 23, 1964, Ser. No. 384,657
8 Claims. (Cl. 99—340)

This invention relates to ovens and more particularly to ovens adapted for both baking and broiling.

An object of this invention is to provide means whereby an oven may be readily converted from the conventional arrangement of heaters involving a broiling element at the top of the oven cavity and a baking element at the bottom of the cavity to a high speed broiling arrangement wherein the bottom baking element is selectively repositioned at a higher level in the cavity much closer to the top broiling element, whereby an article to be broiled may be sandwiched between the top element and the raised element for simultaneously broiling both top and bottom surfaces of the article.

Another object of this invention is to provide conversion means whereby the oven may be changed in a simple manner from the conventionally provided heat distribution for baking to the concentration required for speedily broiling by changing the location of the conventional heating elements from widespread units at the bottommost level of the oven to close laterally grouped units at a higher level whereby the article to be broiled is closely sandwiched in between top and bottom heaters for speedily broiling such article. The means whereby this conversion is made resides in dividing the conventional bottom oven heating element into two or more elements, each terminating in a plug means for the usual connection into the circuitry of the oven through the use of an equal number of receptacles widely spread at the bottom level of the oven or the alternative connection into the circuitry of the oven at a higher level through other receptacles more closely grouped for the concentration of the radiant heat provided.

While in the specific embodiments herein illustrated and described the bottom baking element is relocated at a higher level for speed broiling, this use of the bottom element at a higher position is for purposes of economy, and, if desired, a third separate heating element may be provided for use at the higher level when speed broiling is desired, leaving the bottom baking element undisturbed. Such third speed broiling element would be stored outside the oven when not used.

In accordance with this invention a drip pan may be laid on the bottom of the oven or on a rack below the intermediate element for catching drippings from the food article being broiled. The surface of the pool of drippings will be too far from the heating element to be affected or overheated to the point where smoke will be formed. Thus the intense heat applied simultaneously to both sides of the article of food to be broiled, with the provision of a dripping pan placed at a distance therefrom sufficient to inhibit the generation of smoke or flames, provides a domestic means for speed broiling.

A feature of this invention is the use of sheathed resistance heaters of a size sufficiently small to be self-supporting when firmly attached to the plug means by which they are connected into the appliance outlets carrying the oven circuitry. Thus, in one form of the invention no supports for the heating elements other than the support provided by the appliance plugs are necessary and the heating elements remain in place during use.

Another feature of the invention resides in the use of a wire grid on which the article of food is placed for broiling which may be supported by conventional means formed in the sides of the oven and which grid may have dependent hooks by which the elements may be supported when the elements are in broiling position. When the elements are placed in their lowermost positions for baking, then such elements may be supported in conventional manner. Other means than those herein disclosed may be utilized for supporting the intermediate speed broiling element.

In an alternative form of the invention the shape of the lower elements is changed in such manner that the widespread spacing for baking and the close lateral spacing for broiling may be arranged for by merely turning the elements over rather than plugging them into different appliance receptacles. Thus, if each element is made in a substantially oblong form with the appliance plug at a corner position rather than midway of one of the short sides, the heater will be generally to the right of the position of the receptacle or, if turned over, then generally to the left of the receptacle. By the use of this arrangement other dispositions of the bottom heater may be made, such as a general movement of the source of heat to the left or to the right rather than the widespread spacing or the close lateral spacing provided when the appliance plug is substantially halfway along a short side of the element.

Other features will appear hereinafter.

The drawings consist of two sheets having seven figures, as follows.

The oven 1 is provided in its back wall surface with a number of appliance receptacles, such as 4 and 5. The top heating element 3, terminating in an appliance plug 2, is generally permanently plugged into a top receptacle, hidden in this view, but may be removed for any one of several reasons.

Figure 1:
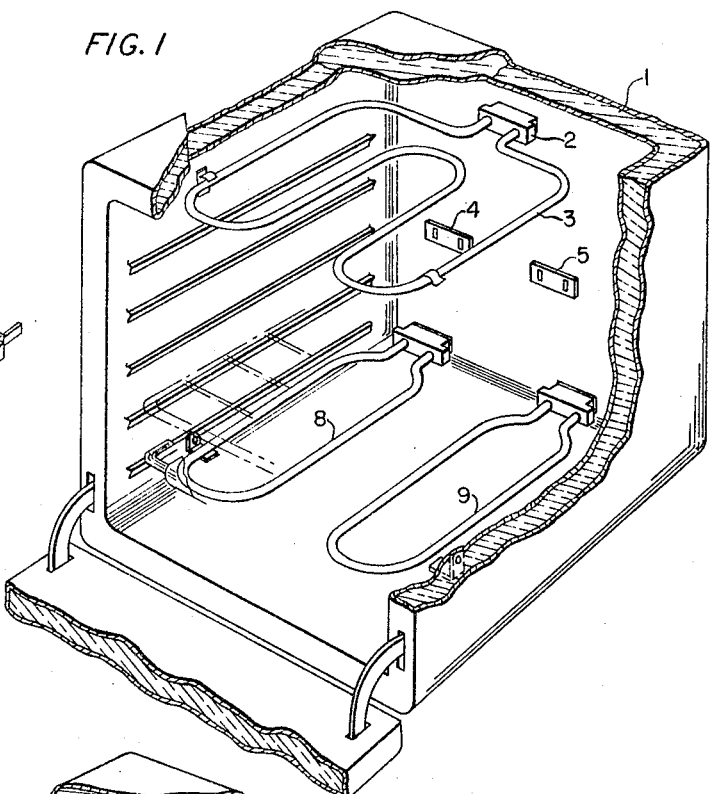
FIG. 1 is a perspective view of an oven partly broken away to show the interior arrangements, particularly when the various sheathed resistance heater units are disposed for baking.
Figure 2:
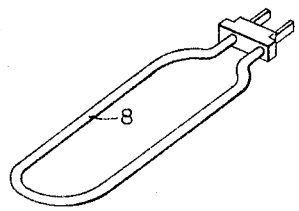
FIG. 2 is a perspective view of one of the smaller elements with its appliance plug which may be used in the lowermost appliance receptacles for baking or the intermediate receptacles for broiling.
Figure 3:
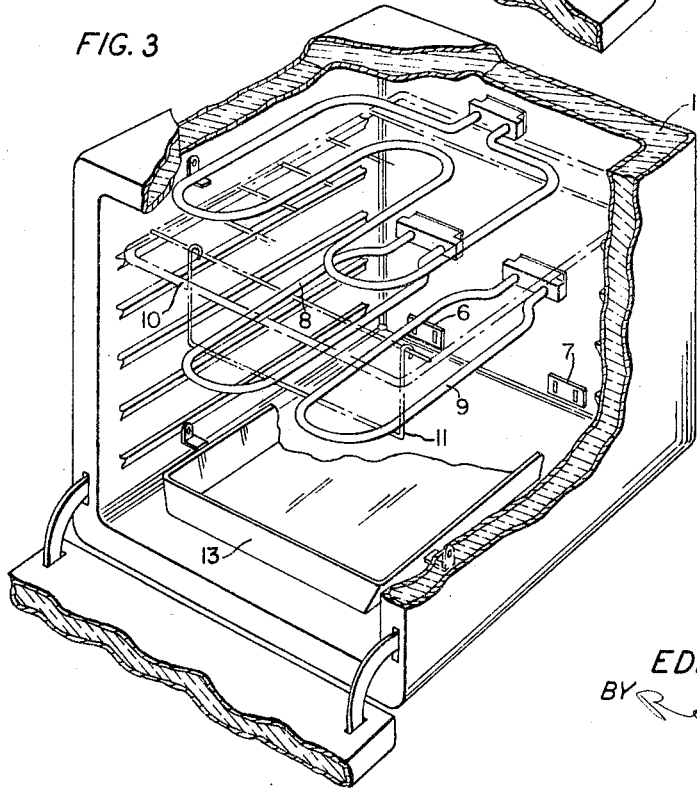
FIG. 3 is a perspective view of the oven of FIG. 1 showing the small heating elements plugged into the intermediate receptacles for broiling.

The other heating elements, two or more, are small, as indicated in FIG. 2 and may be considered to be self-supporting. It is to be noted that the lower-most level of appliance receptacles 6 and 7 are widespread whereas the intermediate level receptacles 4 and 5 are nearer together. Hence the heater loops 8 and 9 are widespread for baking when plugged into the lowermost level of receptacles and are concentrated for broiling when plugged into the intermediate receptacles.

When the small sized heating units are plugged into the intermediate receptacles 4 and 5, a wire grid 10 with a dependent hook 11 may be slipped into the oven and supported conventionally by projections on the sides of the oven. The loop heaters are generally self-supporting, but may be supported by the dependent hook from the grid if it is found necessary.

A dripping pan may be placed on the bottom surface of the oven or on a rack when the elements 8 and 9 are in their intermediate positions for broiling and since this is some distance below the source of heat there will be little chance for the generation of smoke.

Figure 5:
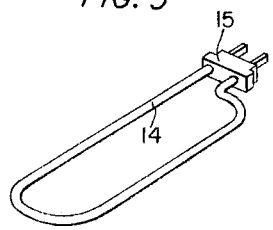
FIG. 5 is a perspective view of the small sized heating element which may be plugged into a receptacle in the position shown or turned over to apply the heat generally further to the left.
Figure 7:
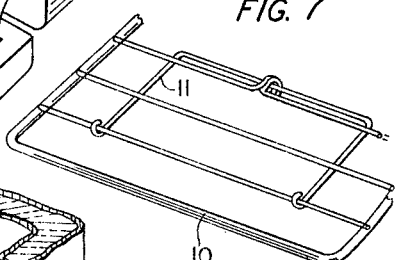
FIG. 7 is a partial perspective view of the wire grid on which the food article to be broiled is placed showing a dependent hook for supporting the lower heater elements, now latched closely to the grid.
Figure 6:
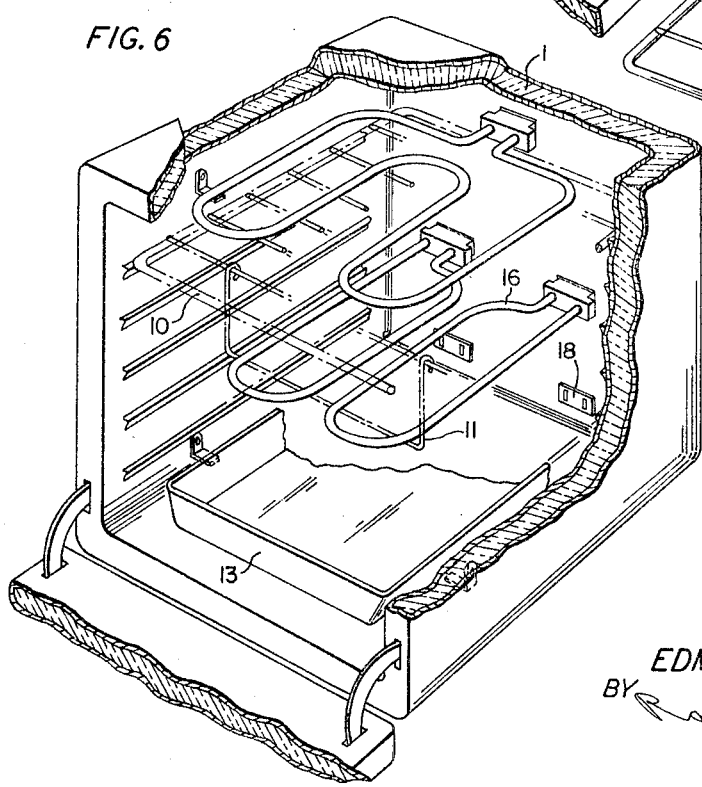
FIG. 6 is a perspective view of the oven showing the small sized heating elements each turned over and plugged into the intermediate receptacles for broiling.

FIG. 5 shows an alternative form of the small heater in which the element 14 is lopsided with respect to its appliance plug 15 and which may be plugged into a receptacle either in the general position shown in FIG. 5 to move the source of heat toward the right or turned over as the element 16 in FIG. 6 to move the source of heat toward the left. Thus, the receptacles 17 and 18 by way of example may be in a vertical line, one directly below the other and the widespread configuration for baking may be obtained by the positions of the elements, such as 19 and 20, or the concentrated heat may be obtained by turning both over for broiling, as indicated by the elements 20 and 16 in FIG. 6.

Figure 4:
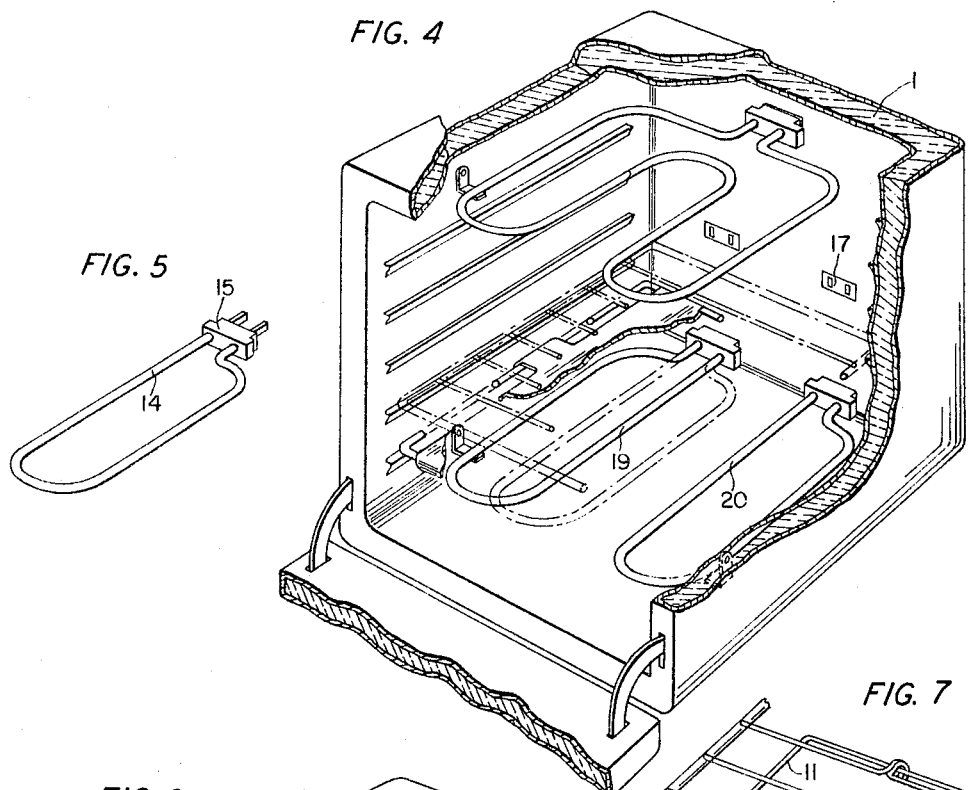
FIG. 4 is a perspective view of the oven showing two small heating elements of an alternative design plugged into the bottom receptacles for baking.

The element 19 has been indicated in dot and dash lines to have been turned over in FIG. 4 to shift both the smaller elements to the right for some special effect as a gentle counterclockwise circulation of the heated air in the oven.

Figure 8:
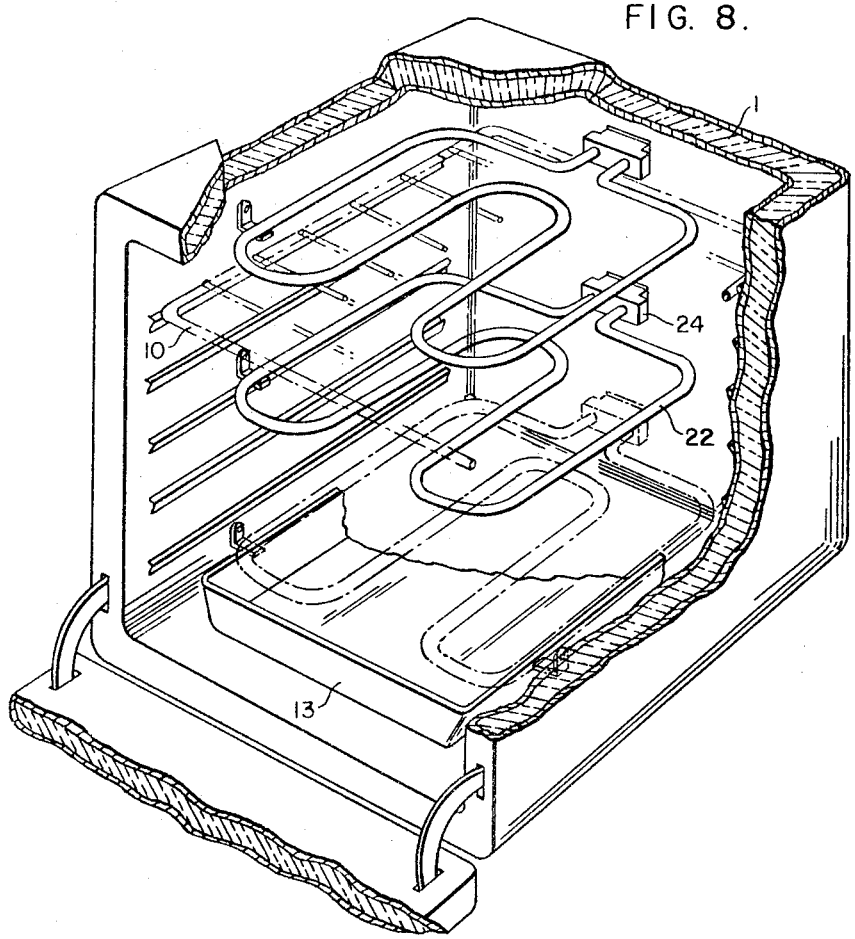
FIG. 8 is a perspective view of the oven showing unitary heating elements plugged into each of the receptacles.

While in most of the figures in the drawing, two selectably movable elements have been shown arranged in side-by-side relationship, the invention is not limited to this arrangement, and it will be apparent that the desired speed broiling may be effected by use of a single movable element such as the bake element conventionally utilized at the bottom of the oven cavity. As shown in FIG. 8, this single bottom element 22 may be plugged into the single intermediate receptacle 24 and thereby be repositioned close to the under surface of the article to be broiled to cooperate with the top element for simultaneous broiling of both sides of the article, thus speeding the broiling operation. Alternatively, the conventional bake element positioned at the bottom of the oven cavity may be left in place for the speed broiling operation and the heating element 22 of FIG. 8 may be an extra or third element which is plugged into the intermediate receptacle 24 to cooperate with the top heating element for the simultaneous broiling of the two faces of the food article. It will be understood of course that as in any conventional broiling operation only the elements positioned to exert a broiling effect are energized when the broiling is to take place.

Also, while the invention is herein illustrated in connection with an electric range, it will be apparent that the inventive contribution may apply also to gas ovens. Consequently, terms such as "heaters," "heating elements," "elements," etc. as used herein are intended to include all suitable sources of heat, including both gas and electricity.

What is claimed is:

1. In an oven, a plurality of heating elements including top and bottom heaters, said bottom heater being constructed and arranged to be changed in location in said oven, the bottom heater comprising a plurality of open work heating elements widespread in location when moved to its lowest level in said oven and closely grouped and lying parallel to and directly below said top heater when moved upwardly nearer to said top heater, the spacing between said top heater and said bottom heater in its upper position being sufficiently small that a food article sandwiched between said heaters has both surfaces simultaneously broiled when said heaters are energized and means for holding an article of food substantially equidistantly between said top and said bottom heaters.

2. In an oven, a plurality of heating elements each terminating in plugs for insertion into receptacles mounted on the walls of said oven for connecting said elements into a source of heat energy for said oven, one of said elements constituting a top heater and being located close to the top wall surface of said oven and another of said elements being selectively located either close to the bottom wall surface of said oven or at a short distance from said top heater, said other element being of open work structure occupying a minor portion of the area bounded by its peripheral outline, said short distance being suitable for sandwiching a food article closely between said top heater and said raised bottom heater, and being sufficiently small that a food article sandwiched between said elements has both surfaces simultaneously broiled when said elements are energized, and a plurality of receptacles mounted on the walls of said oven connected to the heat energy source of said oven for the energization of said heating elements, certain of said receptacles being close to the top surface of said oven, certain of said receptacles being close to the bottom surface of said oven, and another being intermediate the top and the bottom surfaces of said oven.

3. In an oven, a plurality of sheathed resistance heating elements each terminating in plug for insertion into receptacles mounted on the walls of said oven for connecting said elements into the circuitry of said oven, one of said elements constituting a top heater and being located close to the top wall surface of said oven and others of said elements being movable in location through various levels and lateral spacings from widespread spacing close to the bottom surface of said oven to close spacing at a higher level, said other element being of open work structure occupying a minor portion of the area bounded by its peripheral outline, said close spacing being suitable for sandwiching a food article closely between said top heater and said raised bottom heaters, and being sufficiently small that a food article sandwiched between said elements has both surfaces simultaneously broiled when said elements are energized, a plurality of receptacles mounted on the walls of said oven connected to the circuitry of said oven for the energization of said heating elements, certain of said receptacles being close to the top surface of said oven, certain of said receptacles being widespread and close to the bottom surface of said oven and others of said receptacles being closely grouped laterally midway between the top and the bottom surfaces of said oven and wire grid means for holding an article of food between said top and said bottom heaters.

4. In an oven, a plurality of sheathed resistance heating elements each terminating in an appliance plug for insertion into appliance receptacles mounted on the walls of said oven for connecting said elements into the circuitry of said oven, one of said elements constituting a top heater and being located close to the top wall surface of said oven and capable of being energized to produce a given number of watts of electrical energy, and others of said elements comprising bottom heaters movable in location through various levels and lateral spacings from widespread spacing close to the bottom surface of said oven to close spacing at a higher level, said bottom heaters being of open work structure occupying a minor portion of the area bounded by their peripheral outline, said close spacing being suitable for sandwiching a food article closely between said top heater and said raised bottom heaters and being sufficiently small that a food article sandwiched between said elements has both surfaces simultaneously broiled when said elements are energized, said bottom heaters being smaller in size than said top heater and each capable of being energized to produce substantially half the number of watts of electrical energy produced by said top heater, a plurality of appliance receptacles mounted on the walls of said oven connected to the circuitry of said oven for the energization of said heating elements, certain of said appliance receptacles being close to the top surface of said oven, certain of said appliance receptacles being widespread and close to the bottom surface of said oven and others of said appliance receptacles being closely grouped laterally and substantially midway in level between the top and bottom surfaces of said oven, wire grid means for holding an article of food substantially midway between said top heater and said raised bottom heaters, suspending hooks carried by said wire grid for supporting said bottom heaters.

5. In an oven, a plurality of sheathed resistance heating elements each terminating in an appliance plug for insertion into appliance receptacles mounted on the walls of said oven for connecting said elements into the circuitry of said oven, one of said elements constituting a top heater and being located close to the top wall surface of said oven for both baking and broiling, and others of said elements comprising bottom heaters movable in location through various levels and lateral spacing from widespread spacing close to the bottom surface of said oven for baking to close lateral spacing at a higher level for broiling, said bottom heaters being of open work structure occupying a minor portion of the area bounded by their peripheral outline, said close spacing at said higher level being suitable for sandwiching a food article closely between said top heater and said raised bottom heaters and being sufficiently small that a food article sandwiched between said elements has both surfaces simultaneously broiled when said elements are energized, said bottom heaters being smaller in size than said top heater, each said sheathed resistance heaters being constructed and arranged to be substantially supported in space by its said appliance plug, a plurality of appliance receptacles mounted on the walls of said oven for the energization of said heating elements, certain of said appliance receptacles being close to the top surface of said oven, certain of said appliance receptacles being widespread and close to the bottom surface of said oven, and others of said appliance receptacles being closely grouped laterally and substantially midway in level between the top and bottom surfaces of said oven, wire grid means for holding an article of food substantially midway between said top heater and said raised bottom heaters.

6. In an oven, a plurality of sheathed resistance heating elements each terminating in an appliance plug for insertion into appliance receptacles mounted on the walls of said oven for connecting said elements into the circuitry of said oven for connecting said elements into the circuitry of said oven, one of said elements constituting a top heater and being located close to the top wall surface of said oven for both baking and broiling and others of said elements comprising bottom heaters movable to provide different lateral spacings at different levels from widespread spacing close to the bottom surface of said over for baking to close lateral spacing at a higher level for broiling said bottom heaters being of open work structure occupying a minor portion of the area bounded by their peripheral outline, said close spacing at said higher level being suitable for sandwiching a food article closely between said top heater and said raised and closely spaced bottom heaters and being sufficiently small that a food article sandwiched between said elements has both surfaces simultaneously broiled when said elements are energized, a plurality of appliance receptacles mounted on the walls of said oven for the energization of said heating elements, certain of said appliance receptacles being close to the top surface of said oven, certain of said appliance receptacles being close to the bottom surface of said oven for baking, and others of said appliance receptacles being substantially midway in level between the top and bottom surfaces of said oven for broiling, wire grid means for holding an article of food substantially midway between said top heater and said raised bottom heaters.

7. In an oven having a cooking cavity with a bottom wall, a plurality of heating elements, each of said elements having means for connecting it to a source of heat energy, one of said elements being located near the top of said cavity, another of said elements being selectively locatable in a baking position near the bottom of said cavity and in a higher broiling position spaced closely below said one element and substantially above said bottom wall, said other element being of upwardly-unshielded, open-work structure occupying a minor portion of the area bounded by its peripheral outline, said other element being located, in said higher broiling position, parallel to, and generally centered below, said one element with a spacing between said one and said other element being sufficiently small that a food article sandwiched between said elements has its top surface so close to said one element, and its bottom surface so close to said other element, that a substantially greater broiling than baking effect is exerted simultaneously upon both surfaces of said food article when said elements are energized, means for supporting a food article between said elements, said supporting means being of a substantially open-work nature to expose the major portion of the bottom surface of said food article to said broiling effect of said other element and, said means for connecting said elements to a source of heat energy being adapted to maintain substantially continuous energization of both said one element and said other element during said broiling to exert said broiling effect substantially continuously upon both surfaces of said food article.

8. In an oven having a cooking cavity with a bottom wall, a plurality of generally horizontally disposed heating elements, each of said elements having means for connecting it to a source of heat energy, one of said elements being located near the top of said cavity for normal broiling, another of said elements being located near said bottom wall of said cavity for normal baking, and a third element cooperable with said top broiling element for rapid broiling, said third element being of upwardly-unshielded, open-work structure occupying a minor portion of the area bounded by its peripheral outline, said third element being located in an intermediate region of said cavity substantially above said bottom wall and in closely spaced relation to said top element, said third element in said intermediate region being parallel to, and generally centered below, said top element, with said close spacing being sufficiently small that a food article sandwiched between said elements has its top surface so close to said top element and its bottom surface so close to said third element, that a substantially greater broiling than baking effect is exerted simultaneously upon both surfaces of said food article when said top element and said third element are energized, means for supporting a food article between said top element and said third element, said supporting means being of a substantially open-work nature to expose the major portion of the bottom surface of said food article to the broiling effect of said third element, said means for connecting said elements to a source of heat energy being adapted to maintain substantially continuous energization of both said top element and said third element during said broiling to exert said broiling effect substantially continuously upon both said surfaces of said food article.

References Cited by the Examiner

UNITED STATES PATENTS

| | | | |
|---|---|---|---|
| 1,137,050 | 4/1915 | Carlson | 219—403 |
| 2,024,386 | 12/1935 | Phelps | 219—395 |
| 2,668,222 | 2/1954 | McCormick | 219—403 X |
| 2,767,298 | 10/1956 | Fry | 219—403 X |
| 2,836,697 | 5/1958 | Jordan | 219—403 X |
| 2,848,592 | 8/1958 | Mergen | 219—404 |
| 2,851,575 | 9/1958 | Walston et al. | 99—390 |
| 2,994,760 | 8/1961 | Pecoraro et al. | 219—409 X |
| 3,024,346 | 3/1962 | Sand | 219—404 |
| 3,065,326 | 11/1962 | Crease et al. | 99—340 X |

FOREIGN PATENTS 585,262 2/1947 Great Britain.

LOUIS O. MAASSEL, *Primary Examiner.*

BILLY J. WILHITE, WALTER A. SCHEEL, *Examiners.*